Aug. 13, 1968  G. GARNIER  3,396,710

INJECTION PUMPS

Filed May 2, 1966

United States Patent Office 3,396,710
Patented Aug. 13, 1968

3,396,710
INJECTION PUMPS
Georges Garnier, Blois, France, assignor to Roto-Diesel, Blois, Loir-et-Cher, France, a company of France
Filed May 2, 1966, Ser. No. 547,004
Claims priority, application France, May 7, 1965, 16,327, Patent 1,444,035
2 Claims. (Cl. 123—139)

ABSTRACT OF THE DISCLOSURE

A mechanism for damping movement of the control member which governs the flow of fuel to the inlet passage of an injection pump of an internal combustion engine. The damping becomes operative when the control member is suddenly moved in a direction to increase the flow of fuel.

This invention relates to liquid-fuel injection pumps for internal combustion engines, said pumps being provided in particular with a metering device, that is to say a device for regulating the flow of fuel in dependence on the running speed of the engine, the purpose of said device being to modify the cross-sectional area of passage or throttling section of the fuel inlet duct.

In pumps of this type, the metering of fuel is performed either as a result of action produced by the driver with a view to obtaining a given running speed or by the action of a speed governor which regulates the quantity of fuel injected according to the opposing torque which the engine has to overcome.

When the driver desires to modify the running speed in respect of a constant opposing torque, he accordingly moves the lever or like member which serves to control the metering or flow-regulating device.

In the event that sharp acceleration is required and rapid action is therefore exerted on the control lever, the flow-regulating device opens abruptly and accordingly results in a temporary admission of a substantial quantity of fuel.

In point of fact, sudden variations of flow can prove detrimental to the life of the engine, especially as a result of thermal unbalance in the general construction or of a local deficiency in lubricating conditions.

The object of this invention is to attenuate the acceleration which is produced by a rapid change of position of the lever which serves to control the flow-regulating device, while nevertheless retaining a sufficient degree of spontaneous action during normal running of the engine as well as ensuring conditions of safety and immediate reduction of flow to zero as soon as circumstances so dictate.

To this end, the invention consists in associating with the flow-regulating device a single-acting hydraulic damping system so that the movement of said flow-regulating device is slowed down in the direction of opening, namely in the direction of increased flow.

In a particular form of embodiment, the damping system consists of a single plunger which is adapted to move in opposition to the action of elastic means within a cylinder with which said plunger forms a chamber filled with a predetermined volume of fuel, a calibrated space being formed between said plunger and said cylinder in such a manner that the liquid contained in said chamber is permitted to escape between these two parts during the plunger stroke which corresponds to the damping action, and means being provided for the resupply of fuel to said chamber. The resupply means referred to can consist of a nonreturn valve which is mounted on the end face of the plunger and closes off during the damping stroke a bore which is formed in said plunger and frees said bore during the return stroke.

The damping device can be disposed in such a manner that the flow-regulating device is brought to bear directly against the plunger stem of the damping system.

The damping system can also be mounted at a distance from the flow-regulating device, the coupling between said system and said device being effected by means of any suitable intermediate member such as, for example, a rocking-lever.

In another form of embodiment, it is the flow-regulating device itself or a member which is rigidly fixed thereto which serves as a damping plunger by traversing a fuel-filled chamber which is closed off by a nonreturn valve for ensuring the resupply of fuel during the closure stroke of the flow-regulating device.

Three forms of embodiment of the device in accordance with the invention will now be described by way of example and not in any limiting sense, reference being made to the accompanying drawings, in which.

Figure 2:
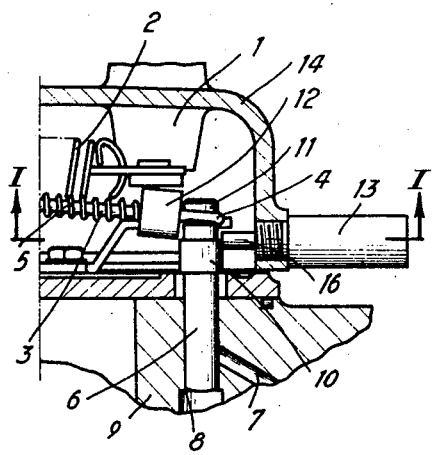
FIG. 2 is a view in cross-section taken along the line II—II of FIG. 1.
Figure 1:
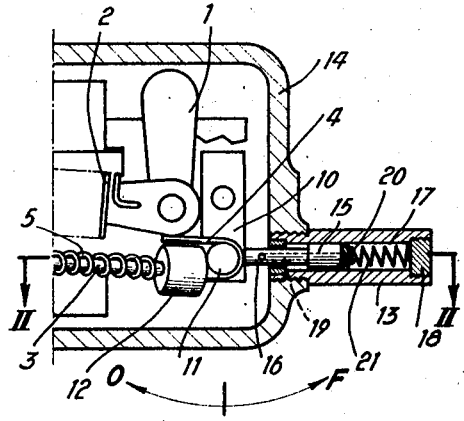
FIG. 1 is a view in horizontal cross-section taken along the line I—I of FIG. 2 and showing a damping system which is mounted on a pump comprising a rotary flow-regulating device.

In the example of FIGS. 1 and 2, the damping system is mounted on a pump comprising a rotary flow-regulating device, for example of the type described in French Patent No. 1,304,748 of Aug. 28, 1961 but additionally provided with a centrifugal-type mechanical governor which is known per se.

In this arrangement, each position of the external control lever 1 produces tension on the spring 2 and, in the case of each value of tension which is chosen, a counterweight system produces the displacement of the fuel-regulating or metering valve 6 by means of a rod 3 having a hook 4. The fuel-regulating valve is designed in the form of a shaft which is provided at one end with a groove opposite to the opening of an inclined flow-regulating duct 7.

The valve 6 is housed within a bore 8 of the head 9 through which flows the fuel delivered by the transfer pump to the injection pump proper. The pivotal motion of the valve is controlled by the action produced on a lug 11 of the head 10 either by the end hook 4 in the direction of closure or by the stop 12 which is slidably mounted on the rod 3 in opposition to the action of the spring 5 in the direction of opening.

There is mounted on the path of the head 10 a damping system which consists of a cylinder 13 which is secured by screwing to the wall of the cover 14 and in which is slidably fitted a plunger 15 having an extension in the form of a stem 16, the end of which is in abutment against the head 10 of the valve 6 when this latter occupies the central position thereof (as shown in FIG. 1). A spring 17 returns the plunger 15 towards the left-hand side (as shown in FIG. 2).

The chamber 21 which is formed by the plunger 15 and the bottom 18 of the cylinder 13 is always resupplied with fuel by means of an axial bore 19 which is pierced in the plunger 15 and stem 16 and which opens laterally on this latter. An end valve 20 which is made of deformable plastic, for example, performs the function of nonreturn suction valve.

It follows as a result of the foregoing that, in the case of a rapid displacement of the control lever 1 in the direction of opening, the link-rod 3 is drawn towards the right-hand side as shown in FIG. 1, begins to disengage from the lug 11 as a result of the movement of the hook 4 away from said lug. Under the action of the spring 5 which expands, the stop 12 thrusts back the lug 11 and therefore the head 10 which in turn thrusts the plunger 15 towards the bottom 18 of the cylinder 13 by means of the stem 16. The fuel contained in the chamber 21 escapes through the calibrated space which is provided between the plunger 15 and the cylinder 13.

The pivotal motion of the flow-regulating valve 6 is therefore slowed down and said valve cannot move instantaneously to its maximum opening position in spite of the rapid displacement of the control level. The injection flow rate therefore remains at the beginning of the acceleration lower than the maximum flow rate under full load while nevertheless being increased to permit of reasonable acceleration of the engine.

When the plunger 15 has reached the bottom 18 of the cylinder 13, the flow-regulating valve 6 is at its maximum opening position which corresponds to the maximum injection flow rate.

Thereupon, the motor having accelerated, the counterweight system balances the tension of the spring 2, the link-rod 3 is drawn from right to left and is accompanied in its movement by the flow-regulating valve 6 by virtue of the hook 4. Said flow-regulating valve accordingly pivots in the direction of the arrow F as shown in FIG. 1, thereby breaking contact with the stem 16 of the damping plunger.

The damping system is ready to come into action as and when a further acceleration takes place, by virtue of the resupply of the chamber 21 which has been effected through the axial passage 19 since the valve 20 opens during the displacement of the plunger 15 from right to left.

Figure 3:
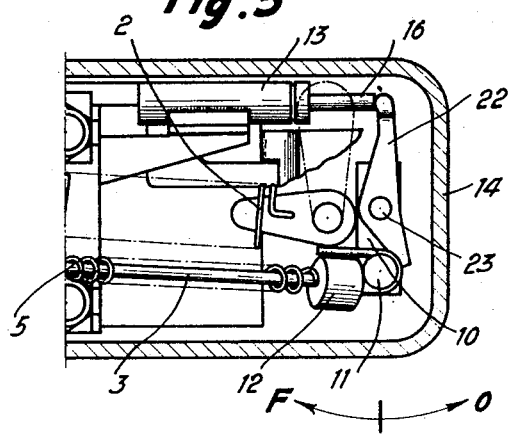
FIG. 3 is a view which is similar to that of FIG. 1, showing an alternative form of assembly with an intermediate lever.

In the example of construction of FIG. 3, the cylinder 13 of the damping system is mounted inside the cover 14 and the plunger stem 16 is coupled with the lug 11 of the head 10 by means of a lever 22 which pivots about the pin 23.

In other respects, the mode of operation of this device is identical with that which is shown in FIGS. 1 and 2.

Figure 4:
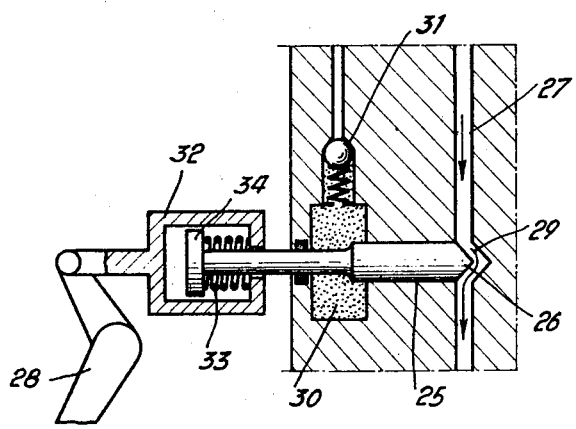
FIG. 4 is a view in vertical cross-section showing a damping system which is mounted on a pump comprising a flow-regulating device of the sliding type.

In the example which is illustrated in FIG. 4, the damping system in accordance with the invention is mounted on a pump comprising a sliding flow-regulator of known type.

The flow-regulating device 25 is a plunger having an extremity 26 which is adapted to close off to a greater or lesser extent the duct 27 which provides a passageway between two chambers. The variation in cross-sectional area which is produced by the action of an acceleration-control lever 28 produces a corresponding modification in the velocity of transfer of fuel within said duct 27 and consequently in the injection flow rate.

Any sudden opening of the regulating inlet 29 produces a sudden increase in said flow rate.

In order to prevent any sudden action on the lever 28 from resulting in sudden opening of the inlet 29, the plunger 25 on the one hand is not coupled directly to the lever 28 and, on the other hand, said plunger penetrates at the time of the opening movement into a chamber 30 which is supplied with fuel by means of a nonreturn valve 31. The controlled operation of the plunger-valve 25 is effected by means of a coupling sleeve 32 inside which the head 34 of the valve 25 is adapted to move in opposition to the action of a spring 33.

The reduction of flow takes place immediately and without damping, the base of the coupling sleeve 32 being applied directly against the head 34 so as to thrust this latter and therefore the valve 25 towards the right-hand side.

On the other hand, the accelerating action is damped in view of the fact that the coupling sleeve 32 begins to compress the spring 33 as it moves towards the left, then draws back the plunger 25 which forces back the liquid contained in the chamber 30. Said liquid flows out through the calibrated leakage space which is formed between the plunger 25 and its housing.

When the engine acceleration falls off, the position of the regulating valve corresponds to no-load running at maximum speed.

When the driver desires to return to the slow-running position, the volume tends to increase within the chamber 30. The valve 32 accordingly opens and permits the resupply of fuel.

It will be readily understood that the invention is not limited in any sense to the constructional details which have been illustrated or described and which have been given solely by way of example.

I claim:

1. In a liquid fuel injection pump for internal combustion engines, a metering valve for varying the restriction in the fuel inlet passage of said pump, a control member for controlling the position of said metering valve, and dashpot means to retard the movement of said control member when said member is actuated to increase the inlet flow rate.

2. In a liquid fuel injection pump as claimed in claim 1, wherein the dashpot means comprises a plunger movable within a cylinder, spring means for returning said plunger, said plunger and said cylinder having space therebetween so that liquid contained within the cylinder is permitted to escape during a plunger stroke, and means for the resupplying fuel into said cylinder.

References Cited

UNITED STATES PATENTS

| | | | |
|---|---|---|---|
| 2,845,915 | 8/1958 | Frick | 123—140 |
| 3,219,020 | 11/1965 | Roosa | 123—140.1 |
| 3,230,946 | 1/1966 | Kleeberger | 123—139.19 |

LAURENCE M. GOODRIDGE, *Primary Examiner.*